Figure 1:
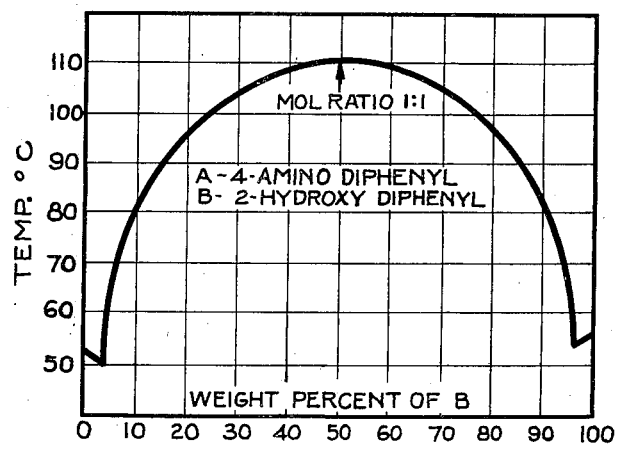

June 15, 1937.    R. L. JENKINS    2,084,034
4-AMINODIPHENYL COMPOUNDS
Filed Nov. 9, 1934

INVENTOR
R.L. JENKINS
BY
*Herbert J Krase*
ATTORNEY

Patented June 15, 1937

2,084,034

UNITED STATES PATENT OFFICE 2,084,034

4-AMINODIPHENYL COMPOUNDS

Russell L. Jenkins, Anniston, Ala., assignor, by mesne assignments, to Monsanto Chemical Company, a corporation of Delaware Application November 9, 1934, Serial No. 752,221

9 Claims. (Cl. 260—130.5)

The present invention comprises new molecular complexes of 4-aminodiphenyl and the monohydroxydiphenyls.

The object of the present invention is to provide molecular complexes or new compounds containing the amino and hydroxy groups attached to the diphenyl nucleus.

Complexes such as herein disclosed may be used in rubber compounding, as addition agents to gasoline, and to other compositions for preservative or disinfecting purposes.

Reference is made to the accompanying drawing, the three figures of which illustrate the freezing points of the several complexes which may be formed as well as the freezing points of compositions containing varying proportions of the complexes. These compositions comprise the system: 4-aminodiphenyl, hydroxydiphenyl.

In the drawing:

Figure 1 shows the melting point range for the system: 4-aminodiphenyl, 2 - hydroxydiphenyl, and indicates a molecular complex of the type:— $NH_2(para) C_{12}H_9 \cdot HO(ortho) C_{12}H_9$, having a freezing point of approximately 110° C. This figure also illustrates the freezing points of compositions containing varying proportions of the complex together with one or the other of its constituent substances. The presence of a eutectic at each end of the melting point-composition curve is indicated by the drop of the melting point curve to the minimum values shown on the diagram.

Figure 2:
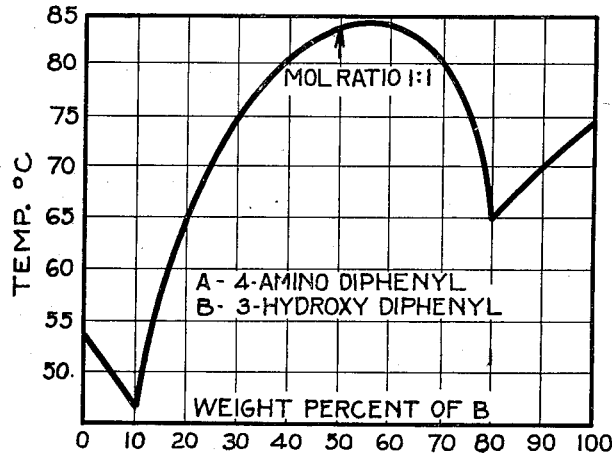

Figure 2 shows the freezing point range for the system: 4-aminodiphenyl, 3 - hydroxydiphenyl, and indicates a molecular complex of the type:— $NH_2(para) C_{12}H_9 \cdot HO(meta) C_{12}H_9$, having a freezing point of approximately 84° C. or 85° C. This material is a crystalline solid. This figure also illustrates the freezing points of compositions containing varying proportions of the complex together with one or the other of its constituent substances. The presence of two eutectics in this system is shown by the drop of the freezing point curve to the minimum values shown on this diagram.

On Figure 2 I show, by means of the arrow, the location of the molecular ratio 1:1. Since this ratio does not correspond exactly to the maximum freezing point shown by the curve, the composition of the complex probably corresponds to a higher ratio of hydroxydiphenyl than that indicated. It is entirely possible that the ratio of the constituents may be in the neighborhood of 2 mols of 4-aminodiphenyl to 3 mols of 3-hydroxydiphenyl. As at present informed, I am of the opinion that the present complex has a composition indicated by the formula:

$$N[NH_2(para) C_{12}H_9] \cdot M[HO(meta) C_{12}H_9]$$

where N/M equals 1 or about 0.60 or a number therein between.

Figure 3:
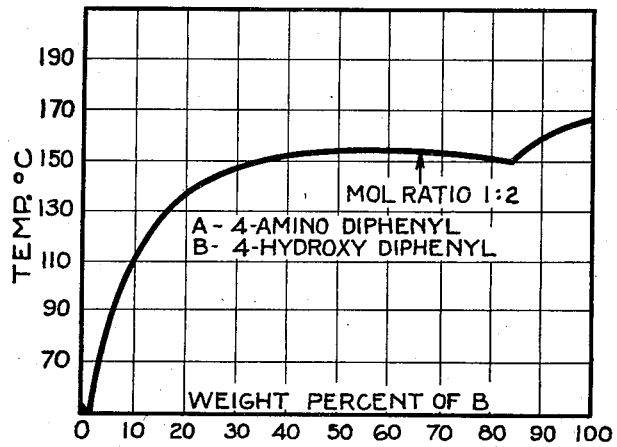

Figure 3 shows the freezing point range for the system: 4-aminodiphenyl, 4 - hydroxydiphenyl, and indicates a molecular complex of the type:— $NH_2(para) C_{12}H_9 \cdot 2HO(para) C_{12}H_9$, having a freezing point of approximately 154° C. The material is a crystalline solid. This figure also illustrates the freezing points of compositions containing varying proportions of the complex together with its constituent substances. The presence of two eutectics in this system is shown by the drop in the freezing point curve to the minimum value shown on this diagram.

The complexes and compositions shown above may be prepared by mixing together the constituent compounds in the proportion indicated and melting the mixture. An alternate method is to effect the combination by mixing together solutions containing the constituent compounds and thereby causing the complex to precipitate from the solution.

I have observed that the complexes described are much less soluble in nearly all solvents than the constituent compounds thereof. This fact affords a ready means for removing from solution any one of the constituent compounds by the addition to the solution of a stoichiometric quantity of the other constituent of the complex. This constitutes a convenient method for preparing the complex and also affords a means for removing the constituents from solution.

The complex may be broken up by forming a salt, by the addition of an acid or an alkali to the complex. Accordingly, I may add an acid to the complex and form the acid salt of the amine. This salt being soluble, I then leach the soluble acid salt from the complex. If the acid chosen forms an insoluble salt with the amine, then a solvent capable of selectively dissolving the phenol is chosen. On the other hand, if the hydroxydiphenyl is desired in soluble form as a phenate, an alkali metal hydroxide is added to the complex, the phenolic body converted to the alkali metal salt and leached therefrom, the amine remaining in the insoluble form. By these means I may readily form and as readily decompose the complexes.

Having now particularly described my invention and the manner of compounding the same, it will be apparent that it is susceptible to various changes and modifications without departing from the spirit thereof, and I desire, therefore, that it be not limited except as necessitated by the prior art or as specifically set out in the appended claims.

What I claim is:

1. A compound of 4-aminodiphenyl and a hydroxydiphenyl.
2. A molecular complex of 4-aminodiphenyl and a monohydroxydiphenyl.
3. A complex of 4-aminodiphenyl and 2-hydroxydiphenyl.
4. A complex of 4-aminodiphenyl and 3-hydroxydiphenyl.
5. A complex of 4-aminodiphenyl and 4-hydroxydiphenyl.
6. A crystalline compound having the formula: $NH_2(para)C_{12}H_9 \cdot HO(ortho)C_{12}H_9$, said compound having a melting point of approximately 110° C.
7. A crystalline compound having the formula: $NH_2(para)C_{12}H_9 \cdot HO(meta)C_{12}H_9$, said compound having a melting point of approximately 84° or 85° C.
8. A crystalline compound having the formula: $NH_2(para)C_{12}H_9 \cdot 2HO(para)C_{12}H_9$, and having a melting point of approximately 154° C.
9. The addition salt of 4-aminodiphenyl and a monohydroxydiphenyl.

RUSSELL L. JENKINS.